US012785328B2

(12) United States Patent
Mandir

(10) Patent No.: US 12,785,328 B2
(45) Date of Patent: Nov. 3, 2026

(54) CONNECTOR ARRANGEMENT WITH RELIABLE MATING DETECTION

(71) Applicant: Yazaki Europe Ltd., Basildon (GB)

(72) Inventor: Mario Mandir, Zagreb (HR)

(73) Assignee: YAZAKI EUROPE LTD., Essex (GB)

( * ) Notice: Subject to any disclaimer, the term of this patent is extended or adjusted under 35 U.S.C. 154(b) by 418 days.

(21) Appl. No.: 18/545,223

(22) Filed: Dec. 19, 2023

(65) Prior Publication Data

US 2024/0204459 A1 Jun. 20, 2024

(30) Foreign Application Priority Data

Dec. 20, 2022 (EP) .................................... 22215091

(51) Int. Cl.
*H01R 13/641* (2006.01)
*H01R 13/627* (2006.01)

(52) U.S. Cl.
CPC ....... *H01R 13/641* (2013.01); *H01R 13/6275* (2013.01)

(58) Field of Classification Search
CPC .............. H01R 13/641; H01R 13/6272; H01R 13/6275; H01R 13/6658
USPC ................................. 439/345, 492, 489, 353
See application file for complete search history.

(56) References Cited

U.S. PATENT DOCUMENTS

| | | | | | |
|---|---|---|---|---|---|
| 5,417,586 | A * | 5/1995 | Endo | H01R 13/641 | 439/353 |
| 6,126,496 | A * | 10/2000 | Shinozaki | H01R 13/7033 | 439/862 |
| 6,257,922 | B1 * | 7/2001 | Shinozaki | H01R 13/7032 | 439/489 |
| 7,648,377 | B2 * | 1/2010 | Naito | H01R 13/7033 | 439/492 |
| 10,224,671 | B2 * | 3/2019 | Sekino | H01R 13/28 | |
| 2007/0237489 | A1 * | 10/2007 | Sasser | G02B 6/4284 | 385/147 |
| 2020/0395706 | A1 * | 12/2020 | Ishikawa | H01R 13/4364 | |

FOREIGN PATENT DOCUMENTS

| | | | | |
|---|---|---|---|---|
| EP | 0 957 541 A2 | 11/1999 | | |
| JP | 09-73954 A | 3/1997 | | |
| JP | 2019-040746 A | 3/2019 | | |
| WO | WO-2008142490 A1 * | 11/2008 | H01R 13/6691 | |

OTHER PUBLICATIONS

The Extended European Search Report of EP22215091 dated Jun. 12, 2023.

* cited by examiner

*Primary Examiner* — Tulsidas C Patel
*Assistant Examiner* — Carlos E Lopez-Pagan
(74) *Attorney, Agent, or Firm* — Sughrue Mion, PLLC

(57) ABSTRACT

A connector arrangement having a connector and a corresponding mating connector, the connector including a housing and a first locking feature for latching with a corresponding second locking feature of the mating connector, the connector further including a mating detection device for detecting a locked state of the first locking feature with the second locking feature, and wherein the mating detection device comprises an electric circuit.

20 Claims, 13 Drawing Sheets

CONNECTOR ARRANGEMENT WITH RELIABLE MATING DETECTION

TECHNICAL FIELD

The present application relates to a connector arrangement having a connector and a corresponding mating connector, the connector comprising a housing and a first locking feature for latching with a corresponding second locking feature of the mating connector, the connector further comprising a mating detection device for detecting a locked state of the first locking feature with the second locking feature, and wherein the mating detection device comprises an electric circuit.

Connector arrangements have been proposed to verify that connectors were fully mated to one another to resolve the problem of connectors visually appearing connected while they are not. Besides mechanical means, electrical circuits arranged in both connector parts are known, wherein mating the connector parts closes the circuit, signaling a locked state.

BACKGROUND ART

WO 2008/142490 A1 discloses a connector assembly comprising a first connector comprising a first locking feature, a second connector comprising a second locking feature cooperating with the first locking feature, a mating detection device adapted to take a first electrical state when the first and second connectors are in a locked state, wherein the mating detection device is mechanically prevented from taking the first state until the first and second locking features lock said first and second connectors together.

SUMMARY OF INVENTION

It can be an objective to provide a more reliable mating detection device.

The objective is achieved by a connector arrangement of claim 1. Embodiments are described in the dependent claims.

According to a first aspect, the connector arrangement has a connector and a corresponding mating connector, the connector comprising a housing and a first locking feature for latching with a corresponding second locking feature of the mating connector, the connector further comprising a mating detection device for detecting a locked state of the first locking feature with the second locking feature. The first locking feature comprises a resilient member, which is deflected by the second locking feature during a mating process, and which is released when the mating process is complete, establishing the locked state. The mating detection device comprises an electric circuit with a spring contact for opening and closing the electric circuit, the spring contact comprising two resilient contact arms, wherein the contact arms are both transferred from an initial position to a translocated position by the resilient member when the resilient member is deflected during the mating process. In the locked state the second locking feature obstructs only one of the contact arms from returning into the initial position when the resilient member is released.

Transferring the contact arms both from the initial position into the translocated position by the resilient member advantageously avoids a premature signalization of the connector and the mating connector being mated. By actuating both contact arms by the resilient member a relative movement of the contact arms is prevented. The transfer of contact arms from the initial position into the translocated position is synchronised by the resilient member and thus the state of the electric circuit remains unchanged during the mating process until the resilient member is released and the first locking feature comes into locking relation with the second locking feature of the mating connector, i.e. when the connector and the mating connector actually mate. The connector arrangement is advantageously applicable for an electric circuit that is adapted to be discontinued when the locked state is reached, as even a slight relative movement of the contacted spring arms during the mating process would cause a premature signalisation of the locked state. Further, as the mating detection device is completely allocated to the connector, it may be provided as a modular device. The corresponding mating connector may have only mechanical features and thus the connector arrangement can be produced in a simpler and more cost-effective way compared to an arrangement with parts of the electric circuit on both connector parts. The one of the contact arms that is obstructed from returning into the initial position is also referred to as the obstructed one of the contact arms, whereas the other one is referred to as the unobstructed one of the contact arms.

The electric circuit can be adapted to signal the event of closing or discontinuing the electric circuit in a suitable way, like by transmitting a signal or ceasing transmittal of the signal, which transmission can be performed wirelessly. A state of the electric circuit may be changed causing a change of the signal. Closing or discontinuing the electric circuit may also cause engagement or disengagement of a transmission antenna or a logic block. The electric circuit can comprise a radio frequency identification (RFID) tag and an RFID antenna. Closing or discontinuing the electric circuit may cause a change of the RFID tag state, which will send a different response. The RFID antenna can be engaged or disengaged, and the RFID tag can be engaged or disengaged.

The two resilient contact arms may have respective contact portions overlapping in a direction from the initial position to the translocated position. When the unobstructed one of the contact arms springs back towards the initial position, the contact portions either get in contact and connect the electric circuit or get out of contact and disconnected the electric circuit. The unobstructed one of the contact arms does not necessarily return to the initial position as it can be blocked by the obstructed contact arm. At least the unobstructed one of the contact arms may be preloaded towards the initial position by being transferred into the translocated position in order to close the spring switch after the resilient member is released. The obstructed one of the contact arms may or may not be preloaded in the same way.

According to an embodiment, a protrusion can be arranged on the obstructed one of the contact arms, the protrusion extending in the initial position into a space occupied by the second locking feature in the locked state, thus obstructing the obstructed one of the contact arms from returning into the initial position when the resilient member is released. The protrusion formed on the spring may as well be referred to as the spring contact protrusion.

According to a further embodiment, at least one of the two resilient contact arms can be made of metal, for example of spring steel or copper. At least one of the two resilient contact arms can be one of a metal strip, a solid wire and a flat wire as semi-finished products, for example. The spring contact protrusion can then advantageously be formed on the obstructed contact arm by bending or press forming the semi-finished product. Further, at least one of the two resilient contact arms can be made of plastic with metal conductive leads disposed on it. The conductive leads can be provided in the form of a foil with a printed circuit on the foil, as sprayed metal conductive paint and/or as conductive plastic. The two contact arms can be formed from different semi-finished products and/or materials.

According to a further embodiment, the electric circuit can be disposed on a circuit board, the two resilient contact arms having respective base portions connected to the circuit board, for example by a mechanical connection, gluing or soldering. The circuit board can be arranged in the housing. At least one of the two resilient contact arms can have a leg portion attached to the resilient member.

According to a further embodiment, the two resilient contact arms can be arranged on a base plate, the base plate being attached to the resilient member. The protrusion can be arranged on the base plate such that it extends in the initial position into the space occupied by the second locking feature in the locked state. The circuit board may in that embodiment be arranged on the base plate, the mating detection device being completely allocated to the base plate and hence advantageously forming a modular part independent of the housing of the connector. The protrusion formed on the base plate may as well be referred to as the base plate protrusion.

According to a further embodiment, the two resilient contact arms made of plastic can be formed in one piece, wherein the obstructed one of the resilient contact arms has a contact bridge formed thereon and the unobstructed one of the resilient contact arms has two separated conductive leads connected to the electric circuit. The obstructed one of the resilient contact arms extends in the initial position into the space occupied by the second locking feature in the locked state. The electric circuit can be disposed on the housing of the connector. Alternatively, the two resilient contact arms and the base plate can be formed in one piece, with the electric circuit being disposed on the base plate, again forming a modular mating detection device.

BRIEF DESCRIPTION OF DRAWINGS

The invention is described in more detail with respect to the attached drawings, wherein.

DESCRIPTION OF EMBODIMENTS

Figure 1:
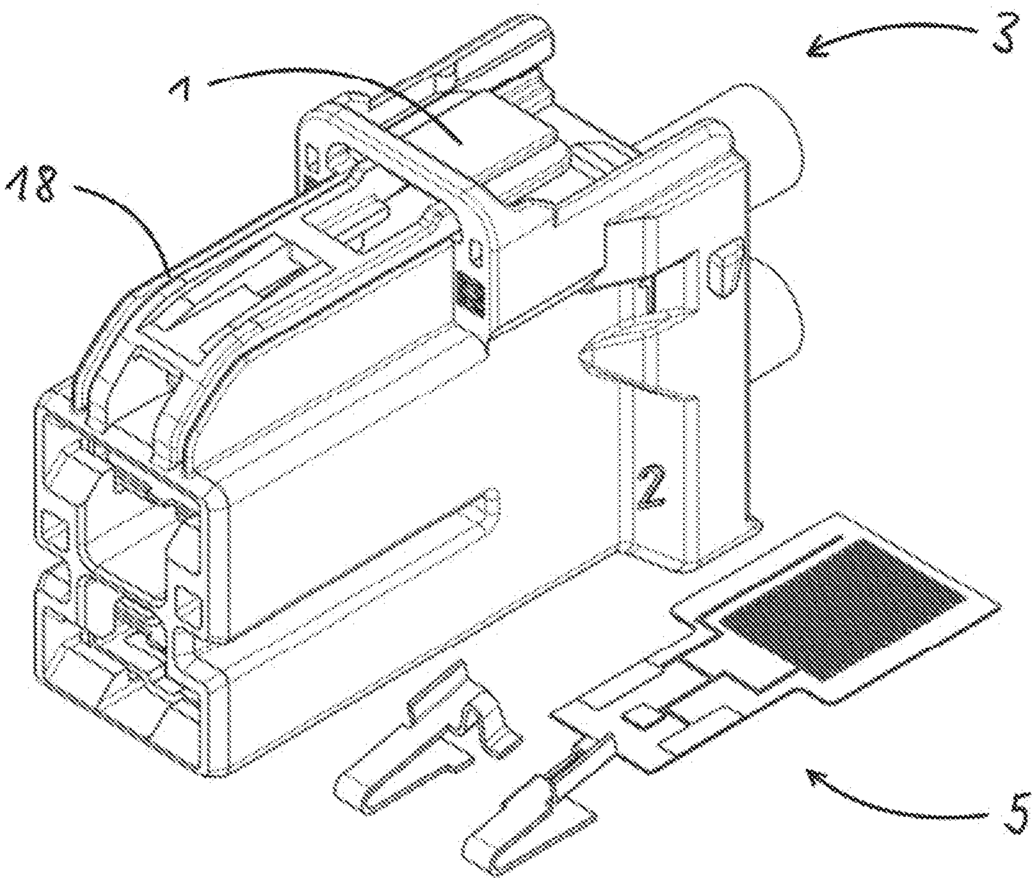
FIG. 1 shows a connector of a first embodiment of a connector arrangement in an exploded view.

In FIG. 1, a connector 3 of a first embodiment of a connector arrangement is illustrated in an exploded view. The connector 3 comprises a housing 18 and a first locking feature 1 for latching with a corresponding second locking feature (2, depicted in FIG. 5). The connector 3 further comprises a mating detection device 5 for detecting a locked state of the first locking feature 1 with the second locking feature 2, which is further described with reference to FIG. 2.

Figure 2:
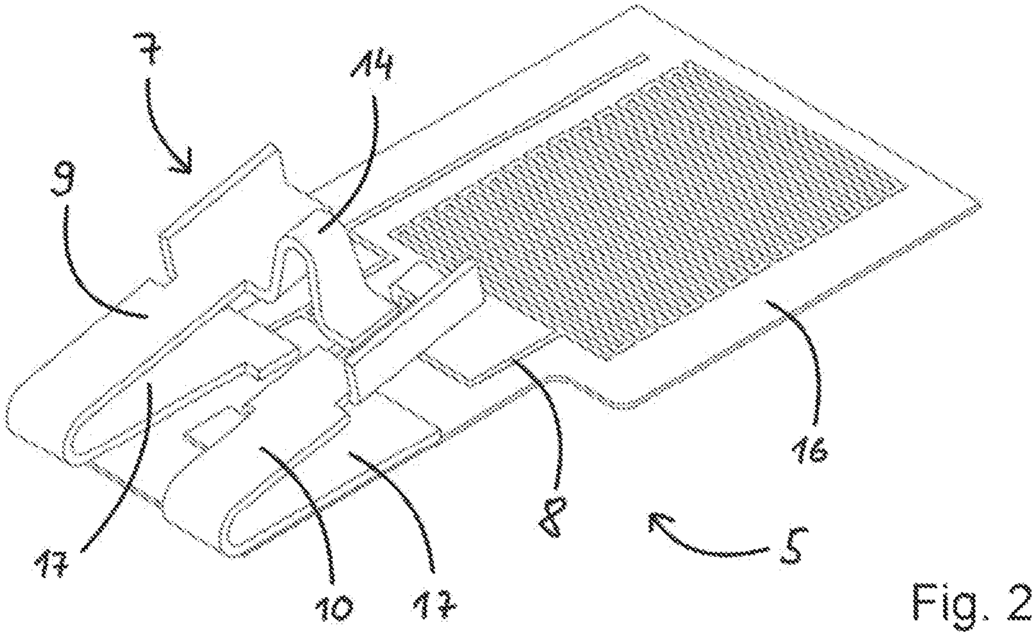
FIG. 2 shows a mating detection device of the embodiment of FIG. 1.

In FIG. 2, the mating detection device 5 is illustrated. The mating detection device 5 comprises an electric circuit 8 with a spring contact 7 for opening and closing the electric circuit 8, the spring contact 7 comprising two resilient contact arms 9, 10. The two resilient contact arms 9, 10 can be made of metal, in particular of spring steel or copper. In the shown embodiment, the two resilient contact arms 9, 10 are formed of metal strips. The electric circuit 8 is disposed on a circuit board 16, the two resilient contact arms 9, 10 having respective base portions 17 connected to the circuit board 16.

Figure 3:
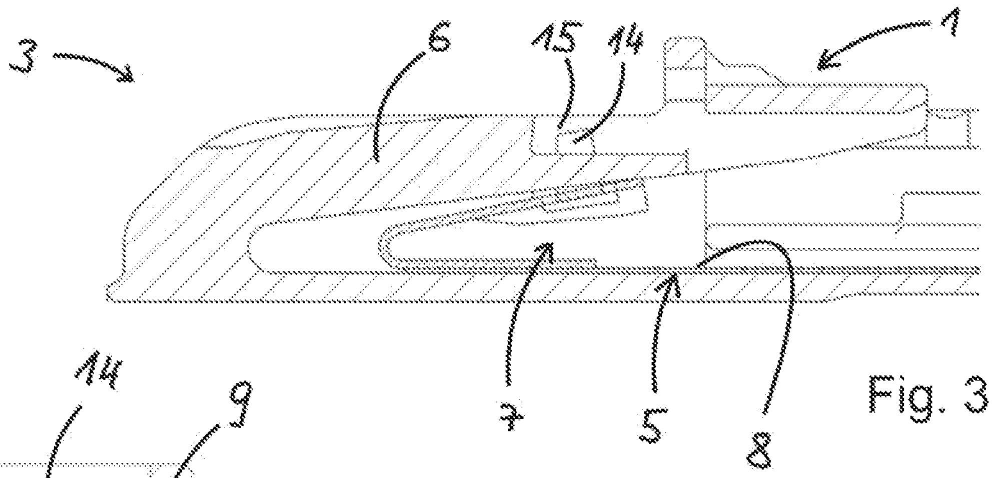
FIGS. 3 and 4 show a detail of the connector of FIG. 1 in assembled state in different views.
Figure 4:
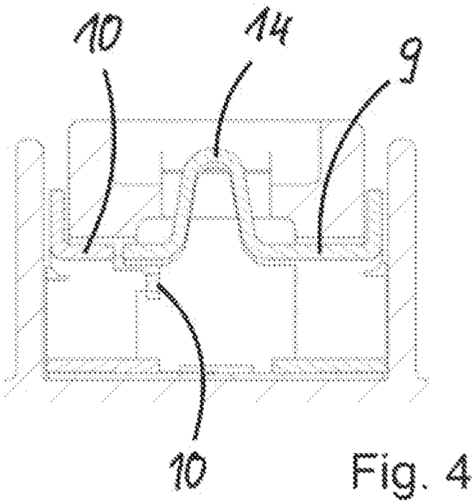

In FIGS. 3 and 4, a detail of the connector 3 of FIG. 1 is illustrated in assembled state in a longitudinal section and in a cross section, which are described together. In the following Figures, where applicable, of the respective embodiments of the connector 3 and the connector arrangement only the detail including the mating detection device 5 and the electric circuit 8 with the spring contact 7 for opening and closing the electric circuit 8 is depicted. The spring contact 7 comprises the two resilient contact arms 9, 10, which are shown in an initial position. The first locking feature 1 comprises a resilient member 6, which is deflected during a mating process towards the spring contact 7. A protrusion 14 is arranged on one of the contact arms 9, which extends in an initial position, that is before the mating process starts, into a window at the resilient member forming a free space 15. The protrusion 14 formed on the spring contact 7 may as well be referred to as the spring contact protrusion 14. The mating process is described as follows with respect to FIGS. 5 to 8.

Figure 5:
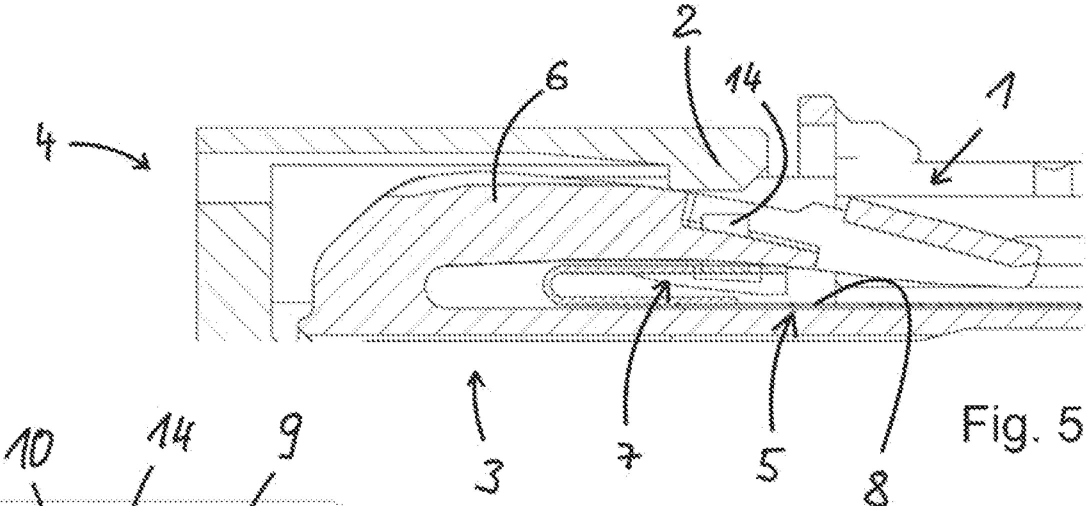
FIGS. 5 to 8 show the first embodiment of the connector arrangement in various phases of a mating process in different views.
Figure 6:
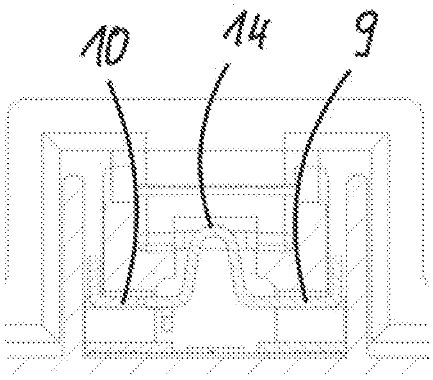

In FIGS. 5 and 6, the first embodiment of the connector arrangement is depicted in a longitudinal section and in a cross section, illustrating a position during a mating process of the connector 3 with a corresponding mating connector 4. The first locking feature 1 for latching with a corresponding second locking feature 2 comprises the resilient member 6, which is deflected by the second locking feature 2 during the mating process, and which is released when the mating process is complete, establishing the locked state. Of the spring contact 7 for opening and closing the electric circuit 8, both of the two resilient contact arms 9, 10 are transferred from the initial position of FIG. 3 to a translocated position by the resilient member 6, which translocated position is shown in FIGS. 5 and 6. The two resilient contact arms 9, 10 are now preloaded towards their initial position.

Figure 7:
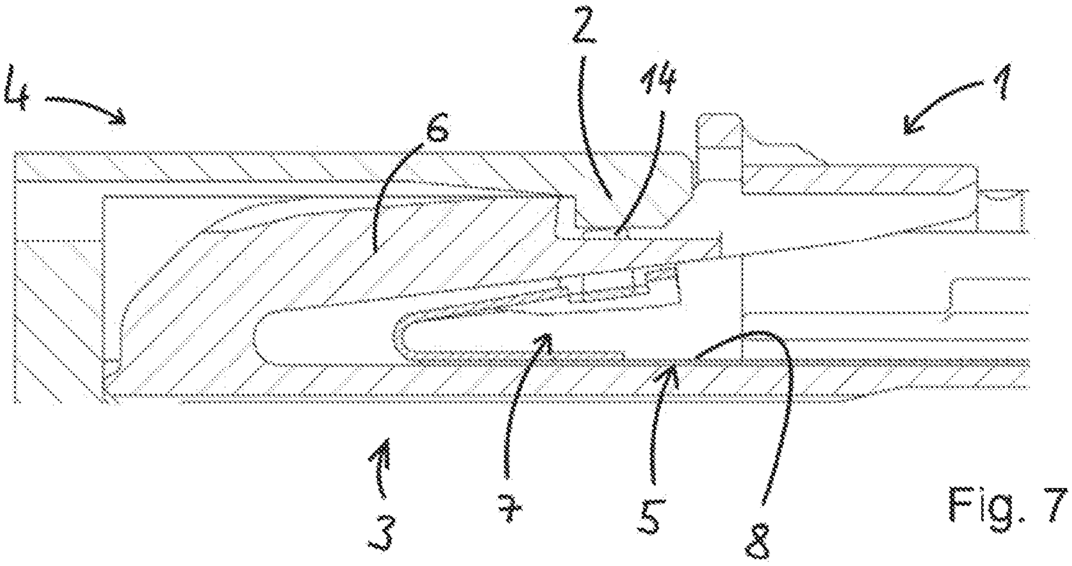
Figure 8:
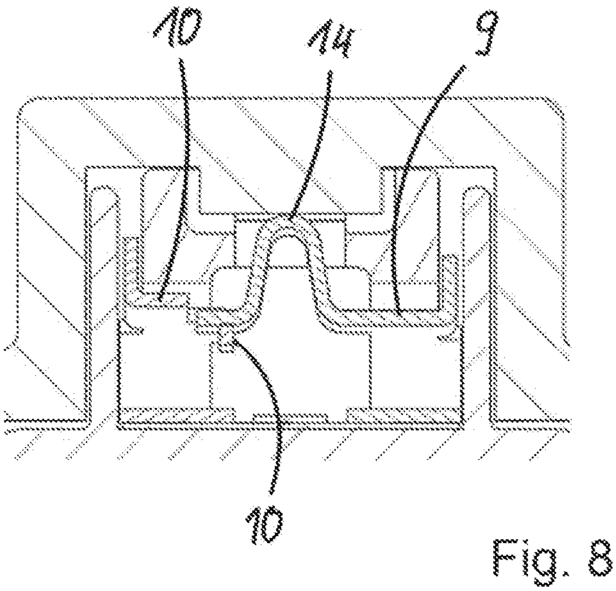

In FIGS. 7 and 8, the first embodiment of the connector arrangement is depicted in locked state in a longitudinal section and in a cross section, illustrating that the resilient member 6 is released as the second locking feature 2 has reached the space 15, which it now occupies, thus locking the connector arrangement in the mating direction. By the second locking feature 2 in the space 15 in the locked state only one of the contact arms 9 is obstructed from returning towards the initial position because of the protrusion 14 arranged on the obstructed one of the contact arms 9 now bearing against the second locking feature 2. Thus now, unlike during the mating process before, the unobstructed contact arm 10 moves relative to the obstructed contact arm 9, the two resilient contact arms 9, 10 getting in contact as a result, closing the electric circuit 8 of the mating detection device 5. The contacting is further illustrated with respect to FIGS. 9 and 10.

Figure 9:
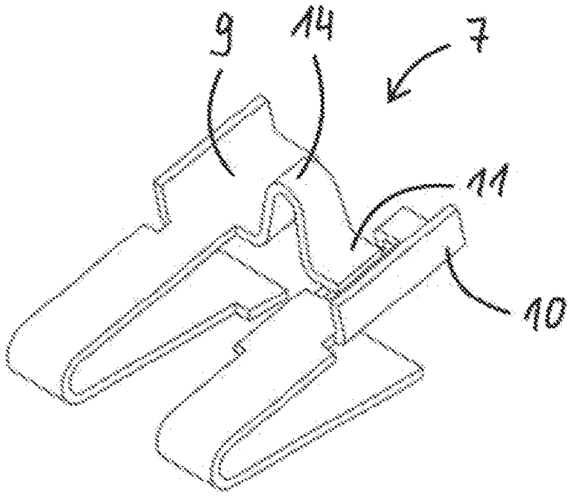
FIGS. 9 and 10 show a spring contact of the first embodiment in different views.
Figure 10:
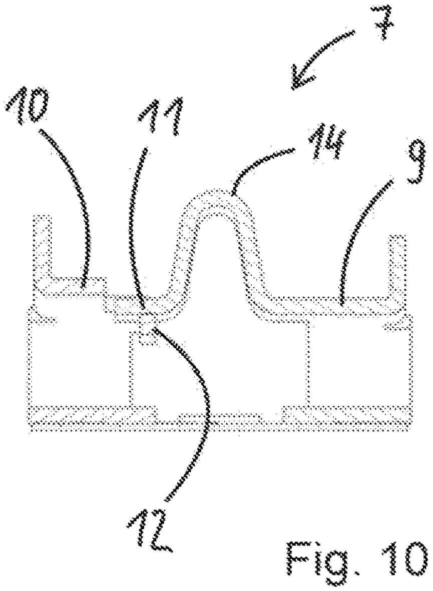

In FIGS. 9 and 10, the spring contact 7 of the first embodiment is depicted as a single part in different views, which are described together. The spring contact 7 is shown in the locked state, in which the spring contact 7 is closed. The two resilient contact arms 9, 10 have respective contact portions 11, 12 overlapping each other in a direction from the initial position to the translocated position, the contact portions 11, 12 get in contact when the unobstructed one of the contact arms 10 springs back towards the initial position, as the contact portion 11 of the obstructed contact arm 9 is arranged between the contact portion 12 of the unobstructed contact arm 10, which thus abuts against the contact portion 11 on the way towards the initial position.

Figure 11:
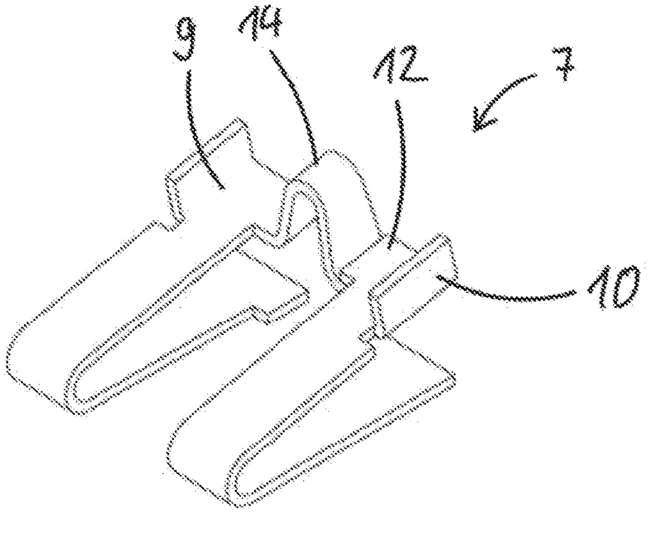
FIGS. 11 and 12 show a spring contact of a second embodiment in different views.
Figure 12:
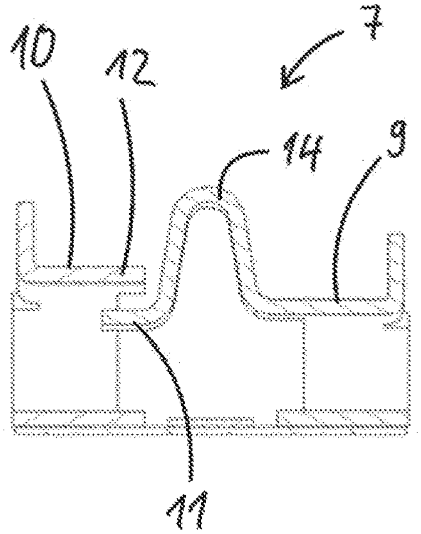

In FIGS. 11 and 12, the spring contact 7 of a second embodiment depicted as a single part in different views, which are described together. The spring contact 7 is shown in the locked state, in which the spring contact 7 is open, as the second embodiment provides a different contact logic. The electric circuit 8 of the mating detection device 5 is discontinued when the contact arrangement reaches the locked state. The contact portions 11, 12 overlapping each other in a direction from the initial position to the translocated position are arranged in exchanged relation when compared to the first embodiment. The contact portions 11, 12 are in contact during the mating process as the contact portion 12 of the unobstructed contact arm 10 is arranged between the contact portion 11 of the obstructed contact arm 9 and the resilient member 6 (not shown). When the unobstructed one of the contact arms 10 springs back towards the initial position, its contact portion 12 is lifted off the contact portion 11 of the obstructed contact arm 9, which cannot follow.

Figure 13:
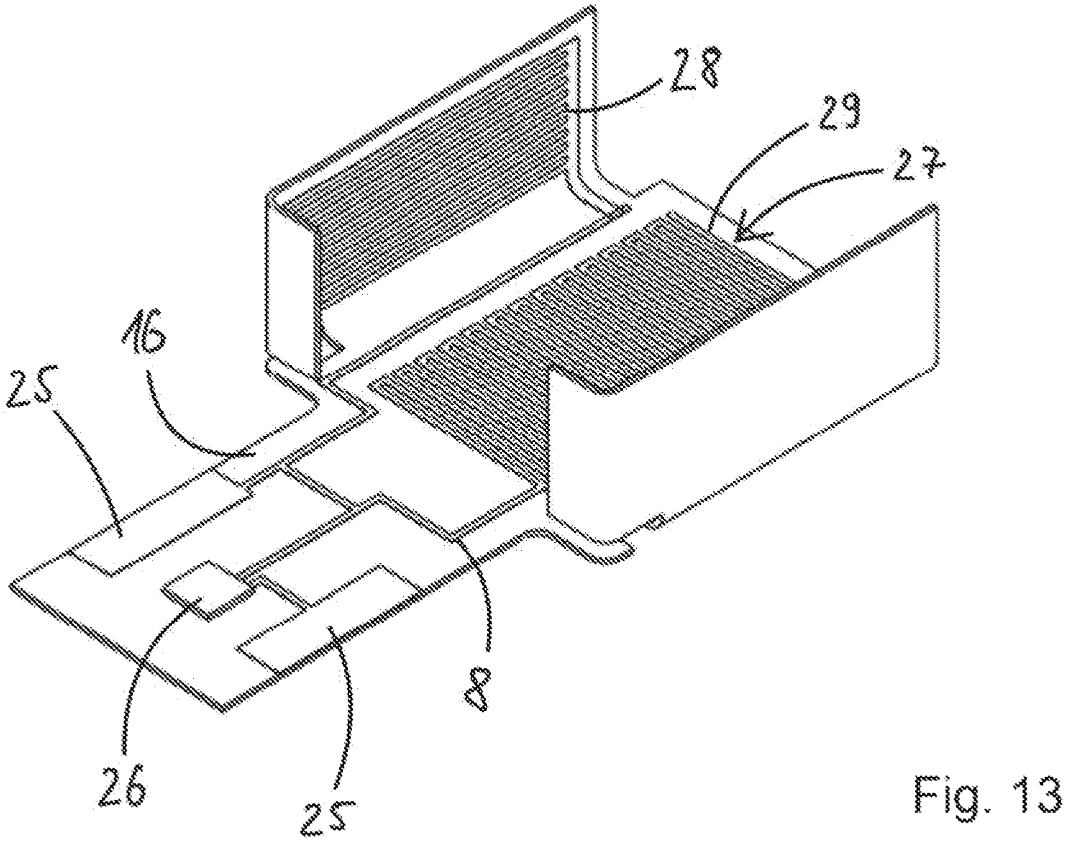
FIGS. 13 and 14 show electric circuits in two versions.
Figure 14:
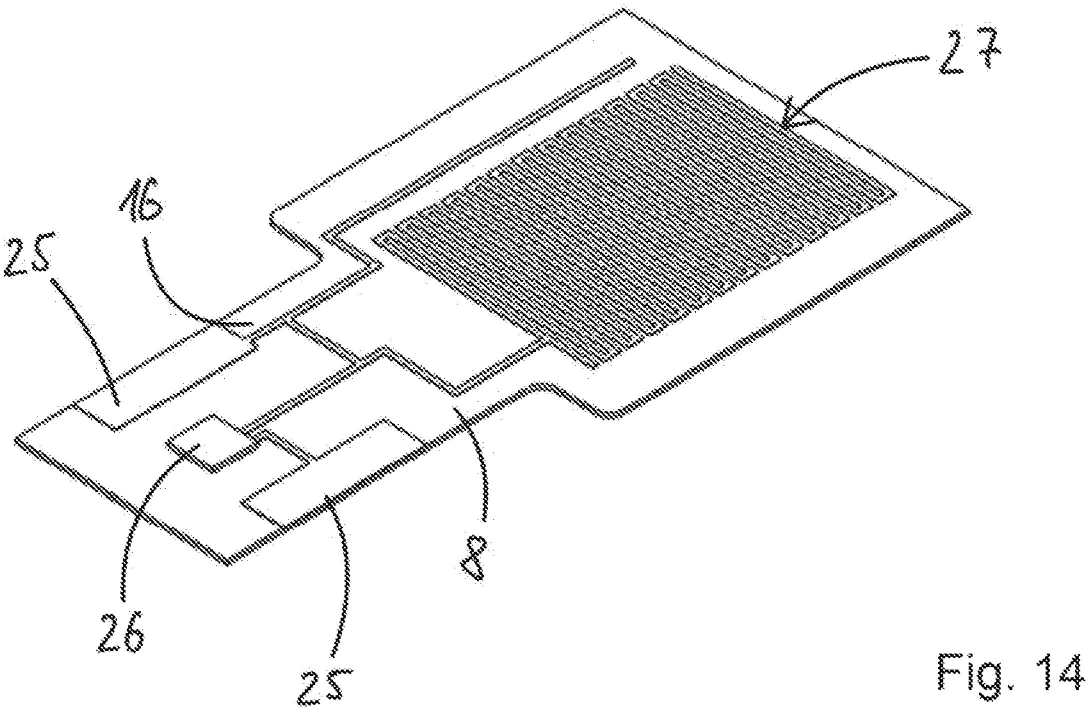

In FIGS. 13 and 14, electric circuits 8 are shown in two versions, which are described together. The electric circuit 8 is disposed on the circuit board 16 with two contact pads 25 for the resilient contact arms 9, 10 (not shown). Disposed on the circuit board are an RFID tag 26 and an RFID antenna 27. The RFID antenna 27 in FIG. 13 comprises side parts 28 arranged at right angles to a central part 29, which advantageously allows the RFID antenna 27 of increased area to extend over three adjacent walls of the housing 18 (not shown).

With respect to FIGS. 15 to 20, alternative embodiments of the spring contact 7 will be described, wherein the two resilient contact arms 9, 10 are made of metal, in particular of spring steel or copper, the two resilient contact arms 9, 10 being a metal strip, a solid wire or a flat wire.

Figure 16:
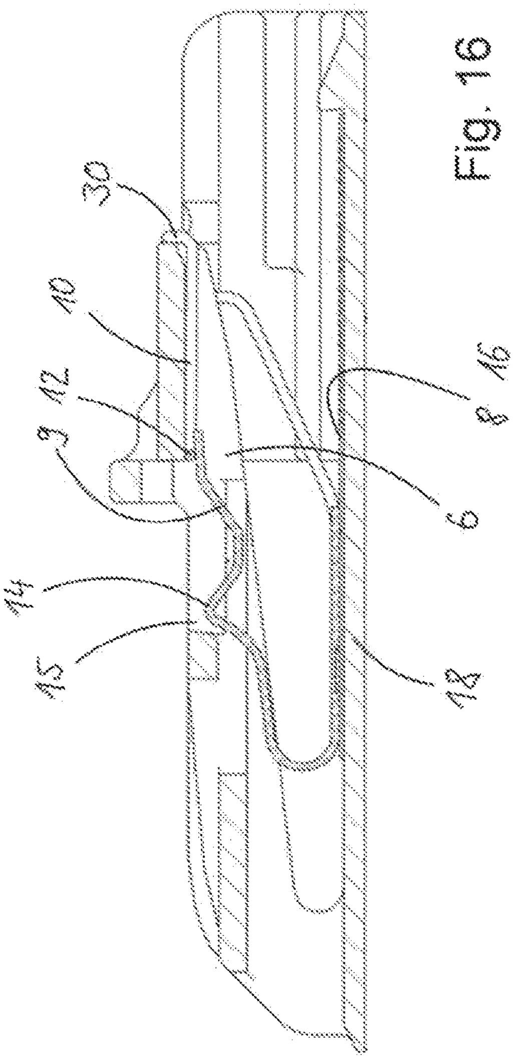
FIG. 16 shows the third embodiment of the connector arrangement in section.
Figure 15:
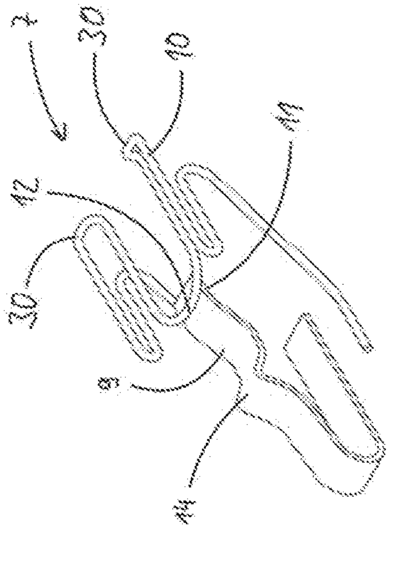
FIG. 15 shows a spring contact of a third embodiment in perspective.

In FIG. 15, the spring contact 7 of a third embodiment is shown as a single part in perspective. The obstructed contact arm 9 is a metal strip with the protrusion 14 formed thereon. The unobstructed contact arm 10 is a solid wire or a flat wire. FIG. 16 shows the third embodiment of the connector arrangement in longitudinal section in the initial position with the spring contact 7 closed. The circuit board 16 is arranged on the housing 18. The protrusion 14 extends into the space 15. The unobstructed contact arm 10 is bent such that the contact portion 12 is formed between the obstructed contact arm 9 and the resilient member 6. Holding portions 30 connect the unobstructed contact arm 10 to the resilient member 6. When the obstructed contact arm 9 cannot return into the initial position after the mating process, the electric circuit 8 is discontinued by the opening spring switch 7 as only the unobstructed contact arm 10 returns to the initial position.

Figure 18:
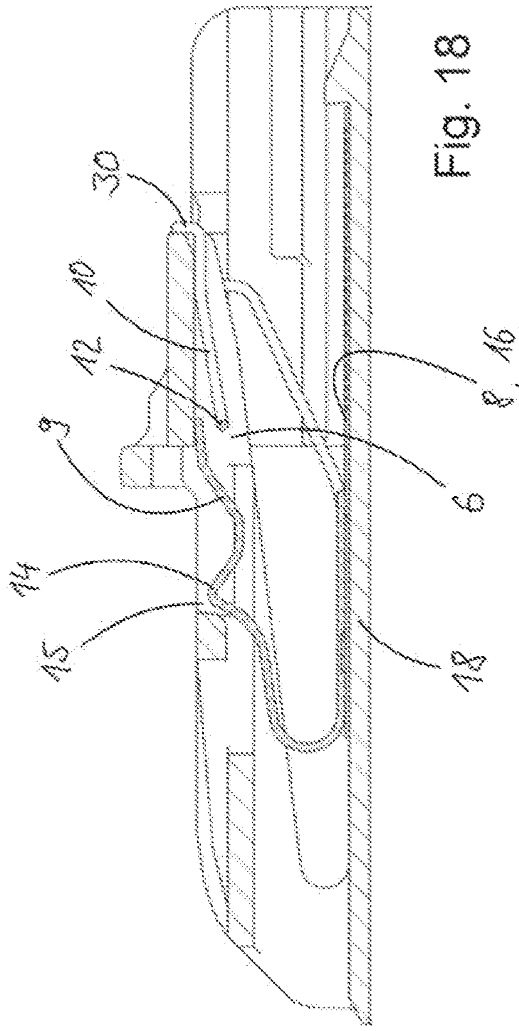
FIG. 18 shows the fourth embodiment of the connector arrangement in section.
Figure 17:
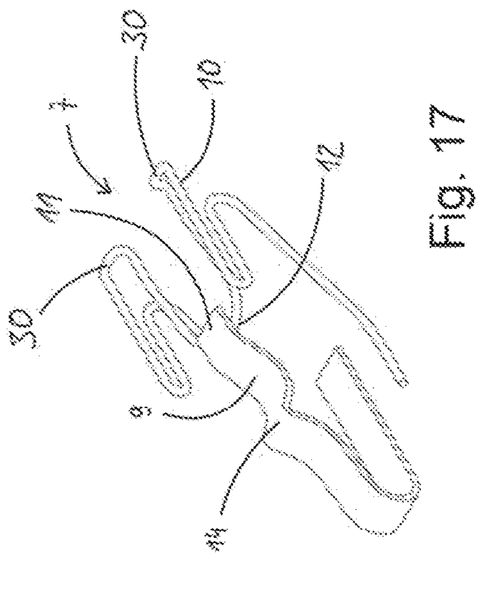
FIG. 17 shows a spring contact of a fourth embodiment in perspective.

In FIG. 17, the spring contact 7 of a fourth embodiment is shown as a single part in perspective. The obstructed contact arm 9 is again a metal strip with the protrusion 14 formed thereon and the unobstructed contact arm 10 is a solid wire or a flat wire. FIG. 18 shows the fourth embodiment of the connector arrangement in longitudinal section in the initial position with the spring contact 7 open. The circuit board 16 is arranged on the housing 18. The protrusion 14 extends into the space 15. The unobstructed contact arm 10 is bent such that the contact portion 12 is arranged between the obstructed contact arm 9 and the translocated position the resilient contact arms 9, 10 take during the mating process. Holding portions 30 connect the unobstructed contact arm 10 to the resilient member 6. When the obstructed contact arm 9 cannot return into the initial position after the mating process, the spring contact 7 closes the electric circuit 8 when the unobstructed contact arm 10 returns towards the initial position.

Figure 19:
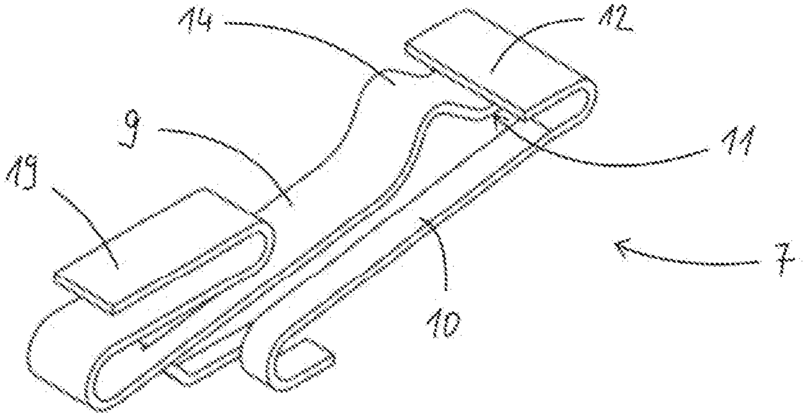
FIG. 19 shows a spring contact of a fifth embodiment in perspective.
Figure 20:
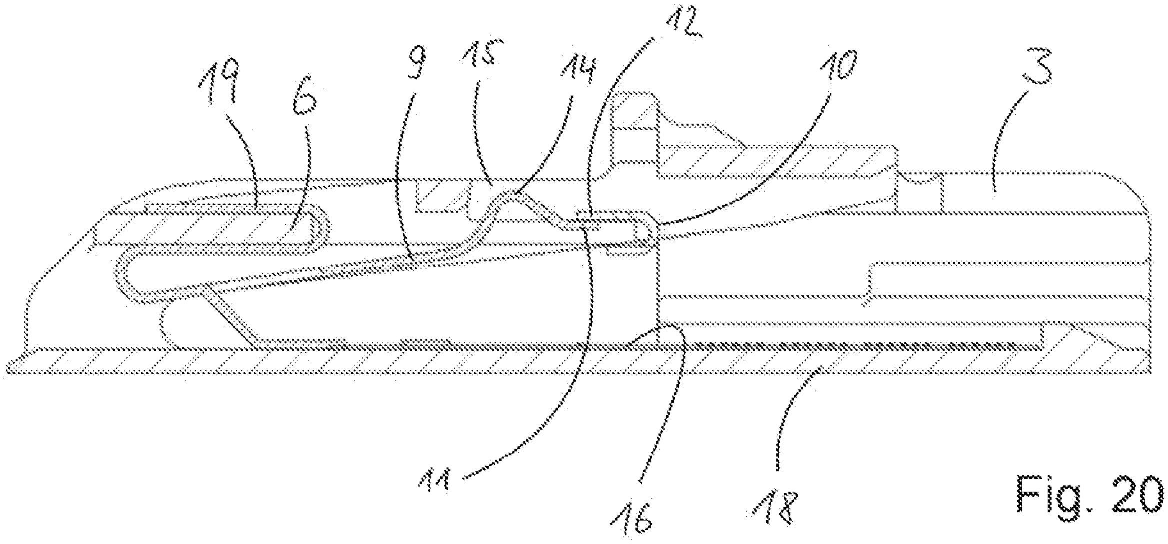
FIG. 20 shows the fifth embodiment of the connector arrangement in section.

In FIG. 19, the spring contact 7 of a fifth embodiment is shown as a single part in perspective. In FIG. 20, the fifth embodiment of the connector arrangement is shown in longitudinal section in the initial position with the spring contact 7 closed. The two resilient contact arms 9, 10 are formed as metal strips. The obstructed contact arm 9 has an additional leg portion 19 attached to the resilient member 6. The unobstructed contact arm 10 has its contact portion 12 formed between the obstructed contact arm 9 and the resilient member 6. When the obstructed contact arm 9 cannot return into the initial position after the mating process, the electric circuit 8 is discontinued by the opening spring switch 7 as only the unobstructed contact arm 10 returns to the initial position. The circuit board 16 is arranged on the housing 18.

Figure 21:
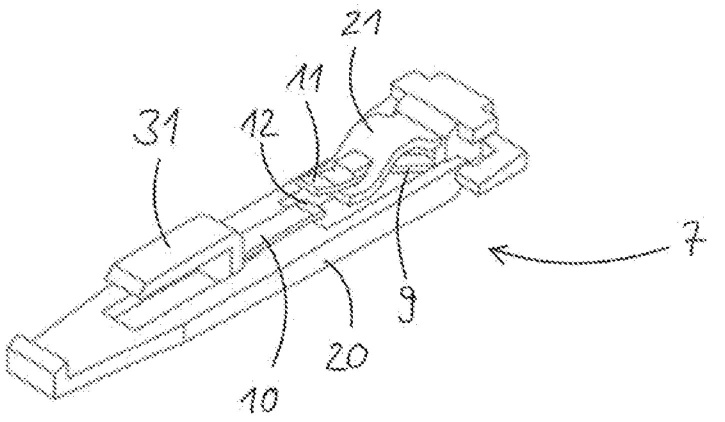
FIG. 21 shows a spring contact of a sixth embodiment in perspective.
Figure 22:
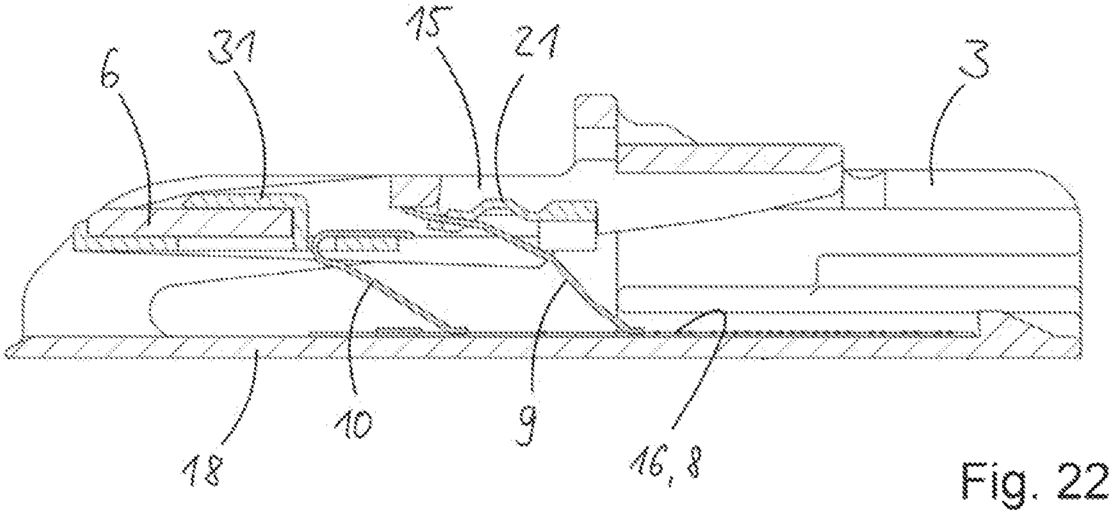
FIGS. 22 and 23 show the sixth embodiment of the connector arrangement in different phases of the mating process.
Figure 23:
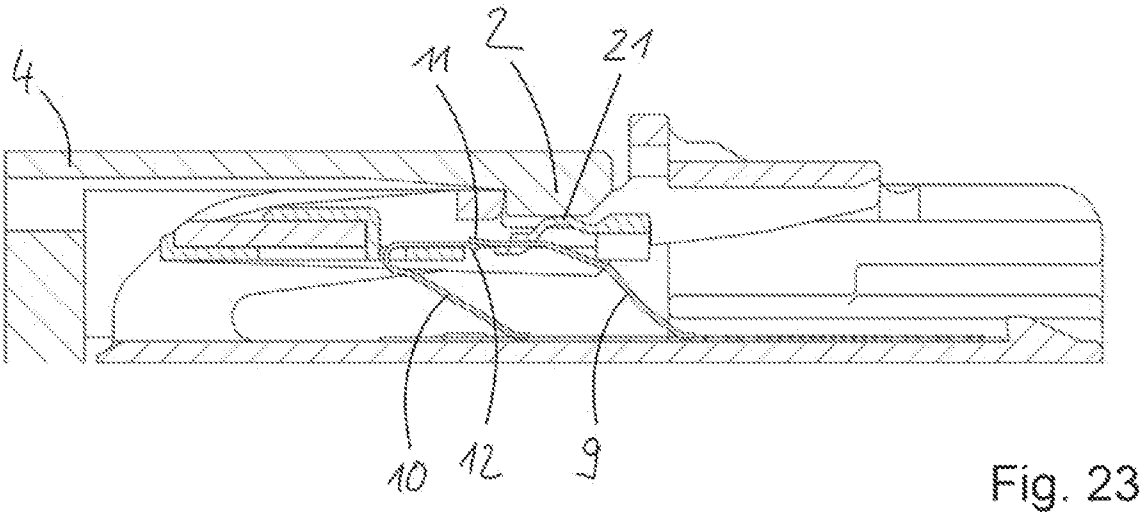

In FIG. 21, the spring contact 7 of a sixth embodiment is in perspective. FIGS. 22 and 23 show the sixth embodiment of the connector arrangement in different phases of the mating process. The FIGS. 21 to 23 are described together. The two resilient contact arms 9, 10 are arranged on a base plate 20, the base plate being attached to the resilient member 6 by a hook portion 31. A protrusion 21 is arranged on the base plate 20 extending in the initial position of FIG.

22 into the space 15 occupied by the second locking feature 2 in the locked state of FIG. 23. The protrusion 21 formed on the base plate 20 may as well be referred to as the base plate protrusion 21. The circuit board 16 is arranged on the housing 18. When the contact arrangement reaches the locked state, the base plate protrusion 21 is obstructed from returning into the space 15 and thus obstructs only one of the resilient contact arms 9, which is thus contacted by the unobstructed contact arm 10, closing the electric circuit 8.

Figure 24:
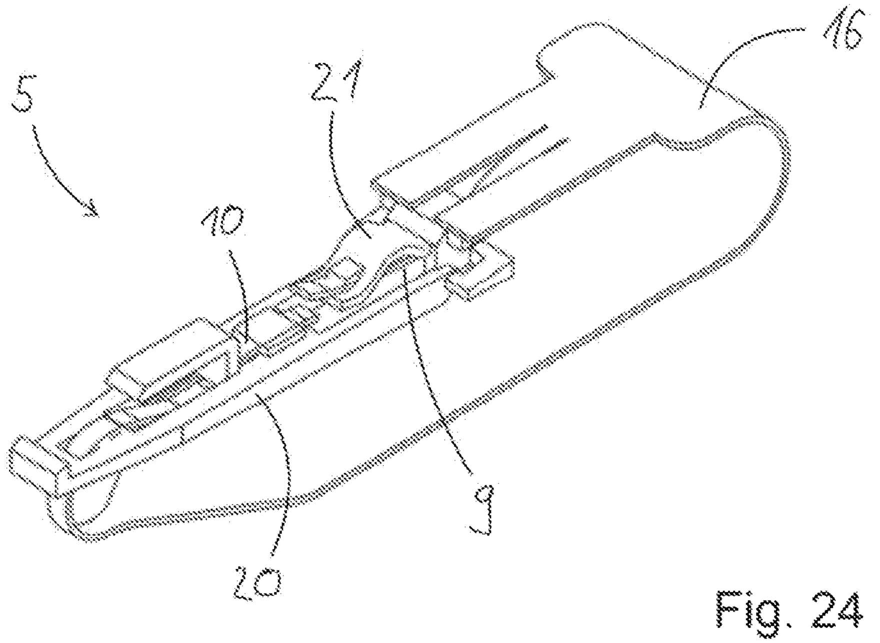
FIGS. 24 and 25 show two versions of a modular mating detection device of a seventh embodiment in perspective.
Figure 25:
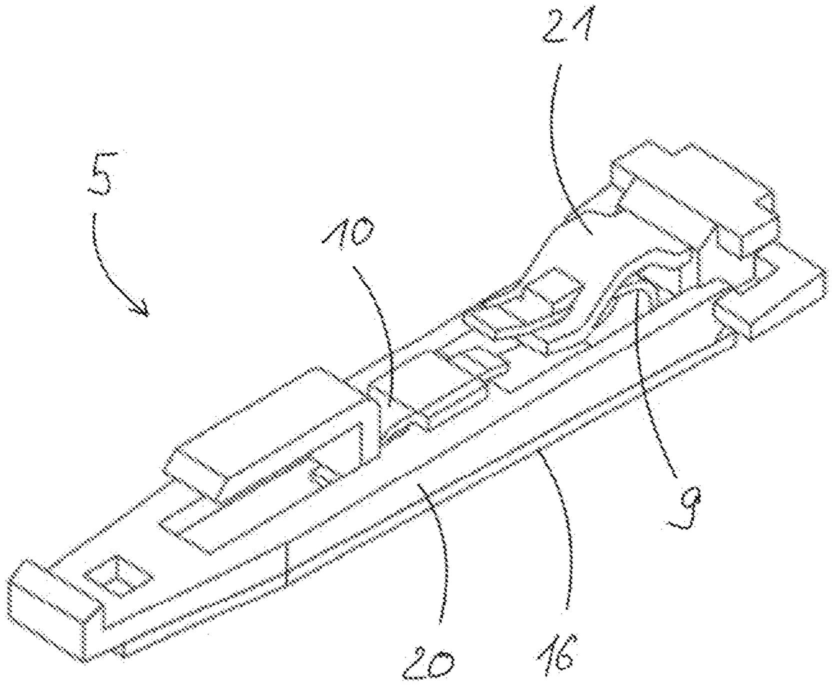

In FIGS. 24 and 25, two versions of a modular mating detection device 5 of a seventh embodiment are shown in perspective. The circuit board 16 with the electric circuit 8 is arranged on the base plate 20 rendering the mating detection device 5 completely independent of the connector housing 18. The two resilient contact arms 9, 10 are arranged on the base plate 20, the base plate 20 having the hook portion 31 for being attached to the resilient member 6. The protrusion 21 is arranged on the base plate 20. The difference of the two versions of a modular mating detection device 5 is the circuit board 16 in FIG. 24 having a greater area to accommodate, for example, a bigger RFID antenna.

Figure 26:
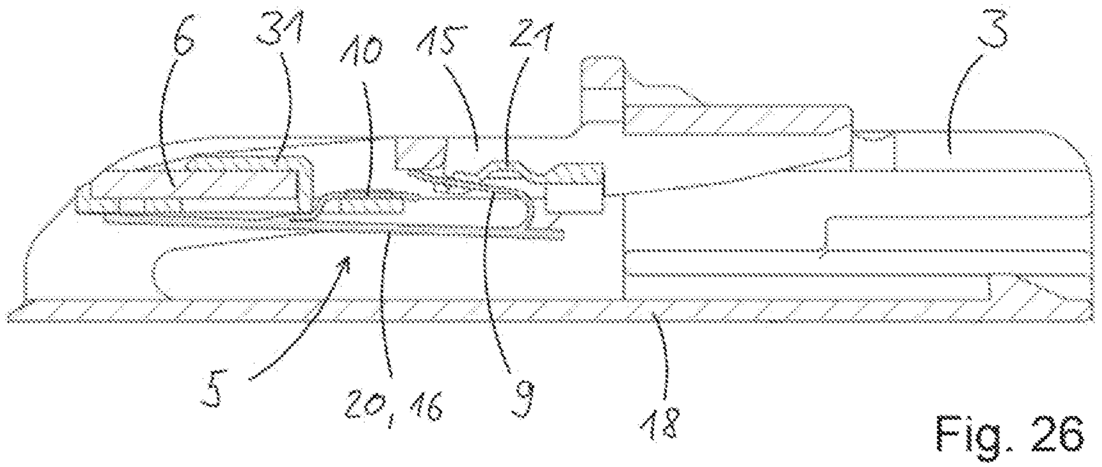
FIGS. 26 to 28 show the seventh embodiment of the connector arrangement in different phases of the mating process with the modular mating detection device of FIG. 25.
Figure 27:
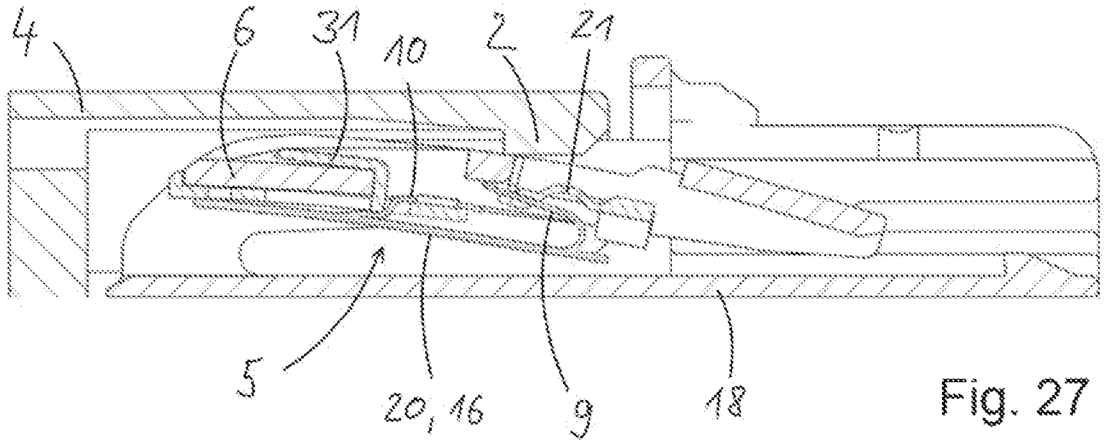
Figure 28:
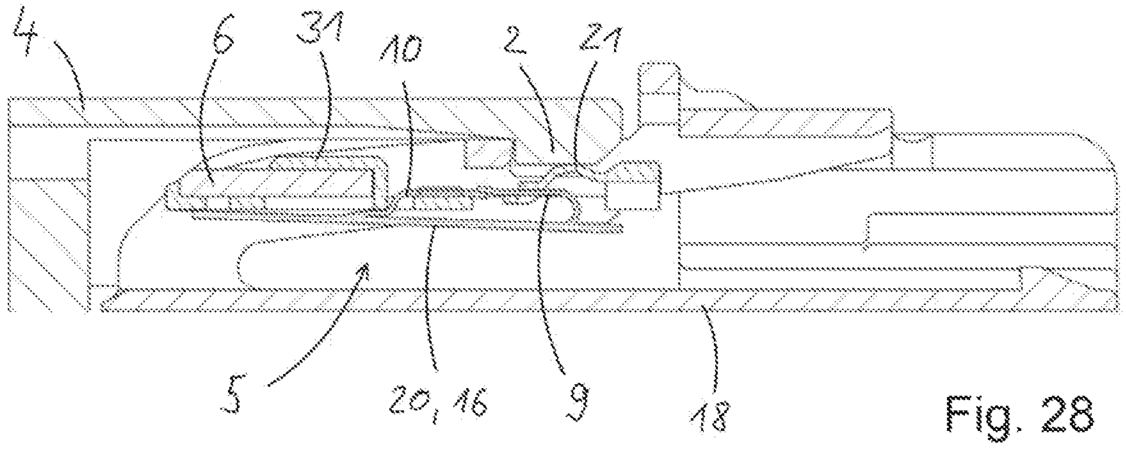

In FIGS. 26 to 28, the seventh embodiment of the connector arrangement is shown in different phases of the mating process with the modular mating detection device 5 of FIG. 25.

In FIG. 26, the connector 3 is illustrated in longitudinal section in the initial position. The protrusion 21 is arranged on the base plate 20 and extends in into the space 15. In FIG. 27, the seventh embodiment of the connector arrangement is depicted in a longitudinal section, illustrating the position during the mating process of the connector 3 with the corresponding mating connector 4. The resilient member 6 is deflected by the second locking feature 2 and both of the two resilient contact arms 9, 10 are transferred from the initial position of FIG. 26 to a translocated position by the resilient member 6. In FIG. 28, the resilient member 6 is released as the mating process is complete, establishing the locked state. The second locking feature 2 occupies the space 15. The protrusion 21 arranged on the base plate 20 bears against the second locking feature 2. Thus now, unlike during the mating process before, the unobstructed contact arm 10 moves relative to the obstructed contact arm 9, the two resilient contact arms 9, 10 getting in contact as a result, closing the electric circuit 8 of the mating detection device 5.

Figure 29:
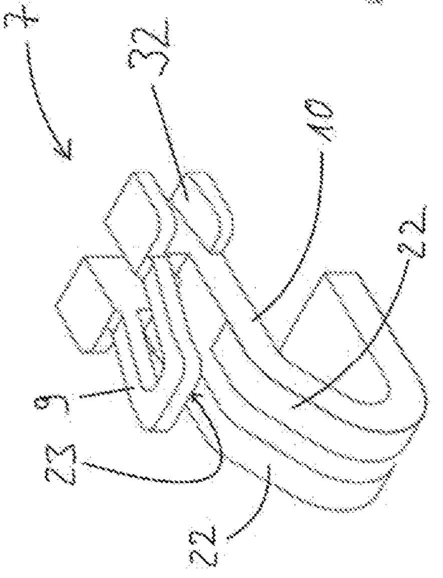
FIG. 29 shows a spring contact of an eighth embodiment in perspective.

In FIG. 29, a spring contact 7 of an eighth embodiment is shown in perspective. The two resilient contact arms 9, 10 are made of plastic with metal conductive leads 22 disposed on them. The two resilient contact arms 9, 10 are formed in one piece, wherein the obstructed one of the resilient contact arms 9 has a contact bridge 23 formed thereon and the unobstructed one of the resilient contact arms 10 has two separated conductive leads 22 connectable to the electric circuit 8. The spring contact 7 has a shelve portion 32 for attaching the spring contact 7 to the resilient member 6.

In FIGS. 30 to 33, the eighth embodiment of the connector arrangement is shown in various phases of the mating process in different views. The two separated conductive leads 22 of the unobstructed one of the resilient contact arms 10 are connected to the electric circuit 8, which is arranged on the housing 18.

Figure 30:
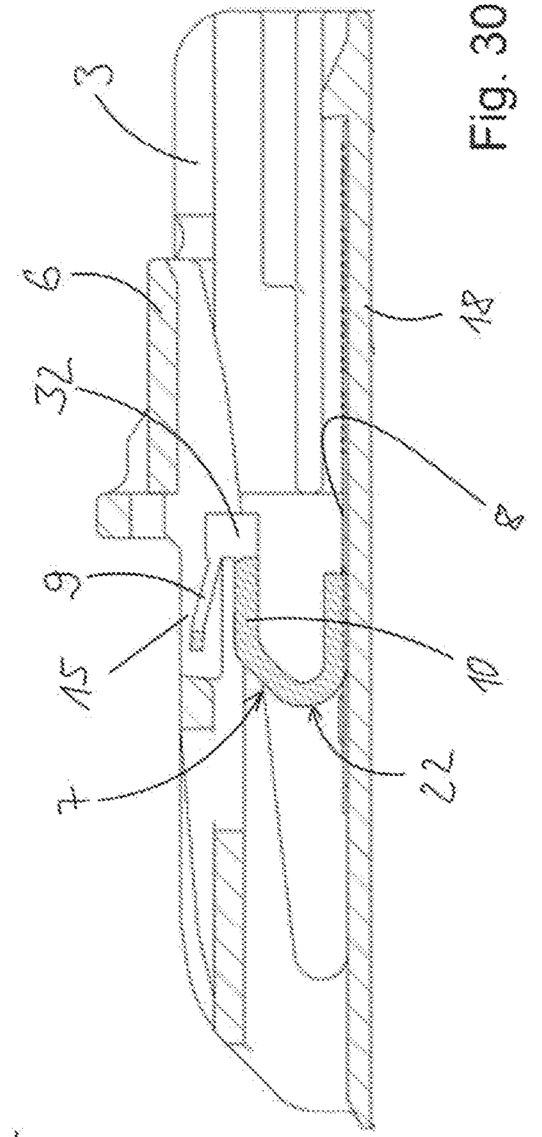
FIGS. 30 to 33 show the eighth embodiment of the connector arrangement in various phases of the mating process in different views.
Figure 32:
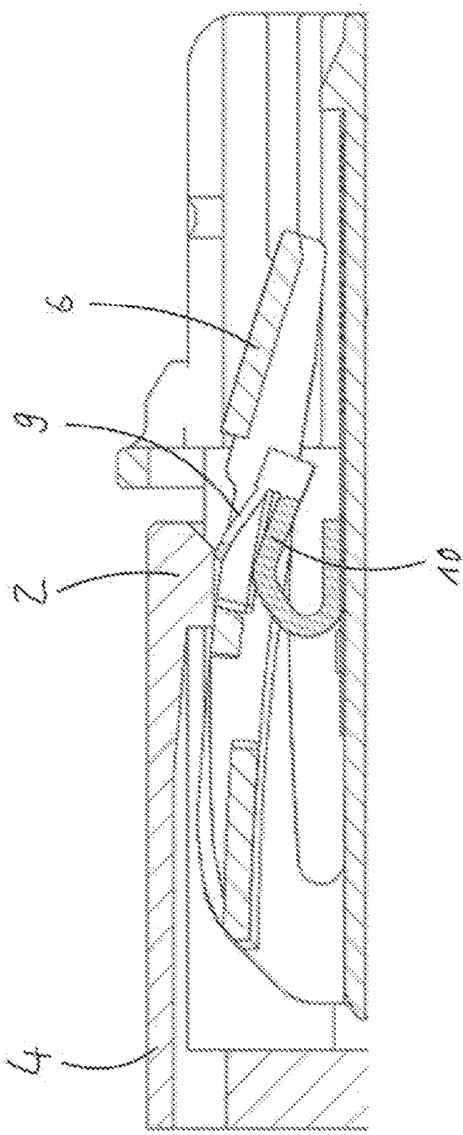
Figure 31:
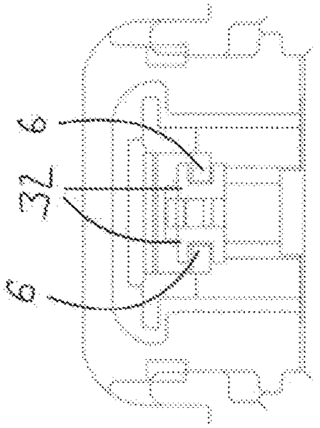
Figure 33:
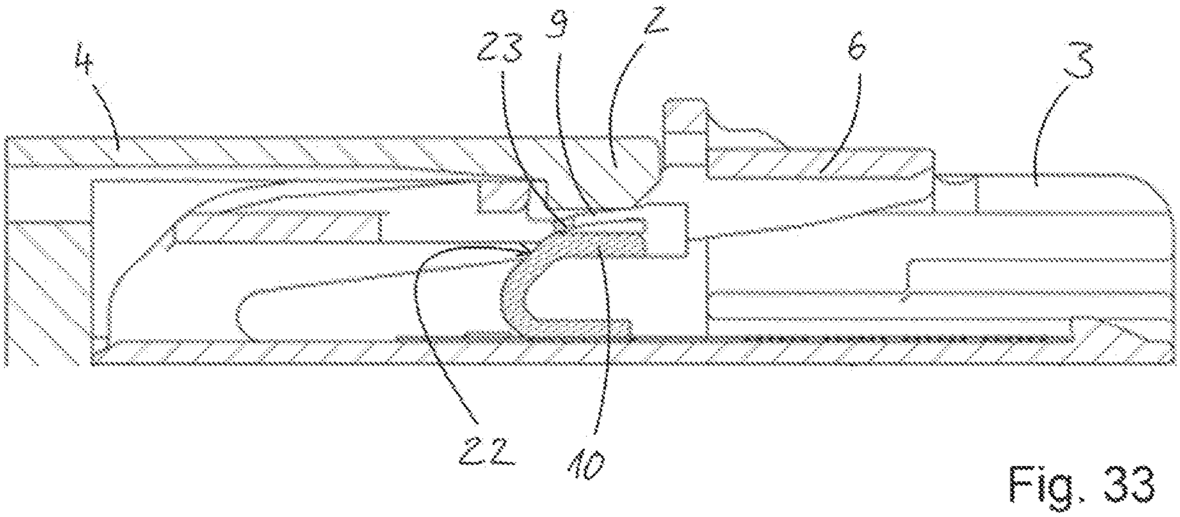

In FIGS. 30 and 31, the connector 3 is illustrated in longitudinal section and in cross section in the initial position. The obstructed one of the resilient contact arms 9 extends in the initial position into the space 15 occupied by the second locking feature 2 in the locked state. The spring contact 7 is fixed to the resilient member 6 by the shelve portion 32. In FIG. 32, the eighth embodiment of the connector arrangement is depicted in a longitudinal section, illustrating the position during the mating process of the connector 3 with the corresponding mating connector 4. The resilient member 6 is deflected by the second locking feature 2 and the spring contact 7 with both the two resilient contact arms 9, 10 is transferred from the initial position to a translocated position together with the resilient member 6. In FIG. 33, the resilient member 6 is released as the mating process is complete, establishing the locked state. The second locking feature 2 occupies the space 15. The obstructed one of the resilient contact arms 9 bears against the second locking feature 2, and, unlike during the mating process before, is deflected when the unobstructed contact arm 10 returns to its initial position, the two resilient contact arms 9, 10 getting in contact as a result. The contact bridge 23 formed on the obstructed one of the resilient contact arms 9 connects the two separated conductive leads 22 on the unobstructed one of the resilient contact arms 10, thus closing the electric circuit 8.

Figure 34:
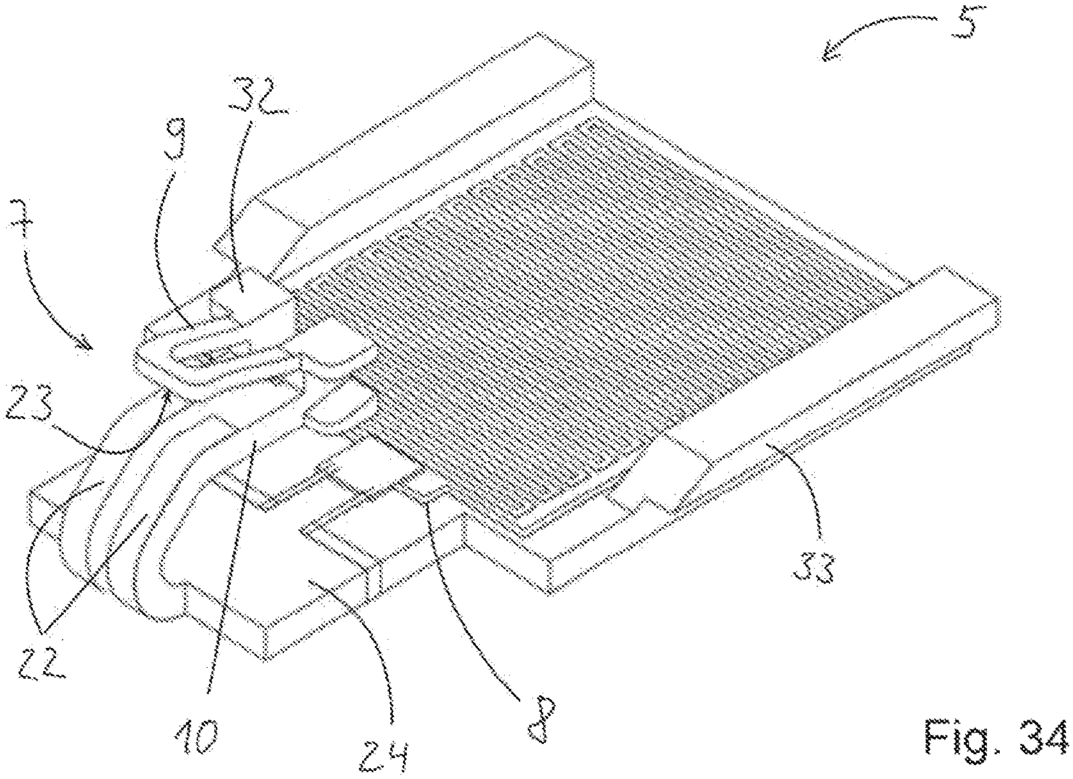
FIG. 34 shows a modular mating detection device of a ninth embodiment in perspective.
Figure 35:
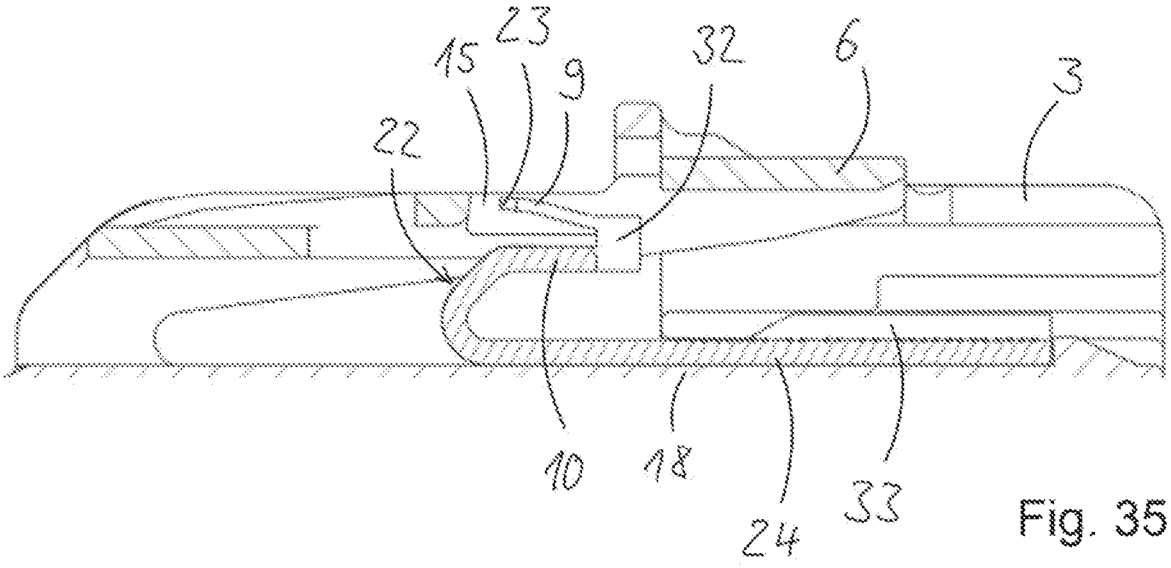
FIGS. 35 and 36 show the ninth embodiment of the connector arrangement in different views.
Figure 36:
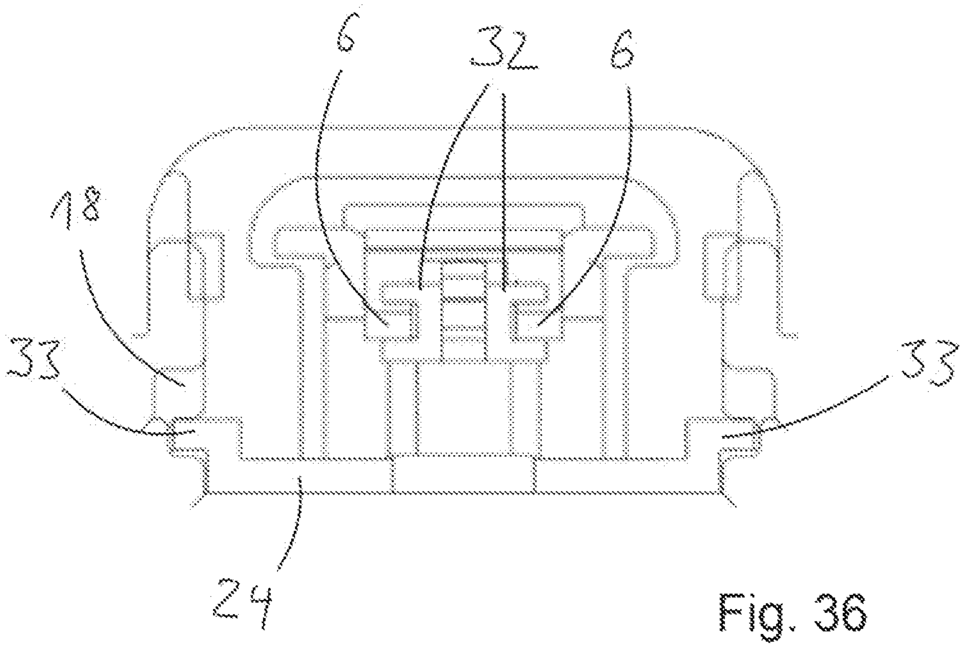

In FIG. 34, a further modular mating detection device 5 of a ninth embodiment is shown in perspective. FIGS. 35 and 36 show the ninth embodiment of the connector arrangement in longitudinal and cross section. The two resilient contact arms 9, 10 and a base plate 24 are formed in one piece. The spring contact 7 has the shelve portion 32 for attaching the spring contact 7 to the resilient member 6 and the base plate 24 has a base shelve portion 33 for attaching the base plate 24 to the housing 18. The one-piece base plate 24 with the resilient contact arms 9, 10 and the electric circuit 8 of the mating detection device 5 disposed thereon form the modular mating detection device 5, which is independent of the housing 18 of the connector 3. The obstructed one of the resilient contact arms 9 extends in the initial position into a space 15 occupied by the second locking feature 2 in the locked state. When the second locking feature 2 occupies the space 15 in the locked state, the obstructed one of the resilient contact arms 9 bears against the second locking feature 2 and is deflected when the unobstructed contact arm 10 returns to its initial position, the two resilient contact arms 9, 10 getting in contact as a result. The contact bridge 23 formed on the obstructed one of the resilient contact arms 9 connects the two separated conductive leads 22 on the unobstructed one of the resilient contact arms 10, thus closing the electric circuit 8.

REFERENCE NUMERALS

1 first locking feature
2 second locking feature
3 connector
4 mating connector
5 mating detection device
6 resilient member
7 spring contact
8 electric circuit
9 obstructed contact arm
10 unobstructed contact arm
11 contact portion of the obstructed contact arm
12 contact portion of the unobstructed contact arm
14 protrusion, spring contact protrusion
15 space
16 circuit board
17 base portions
18 housing
19 leg portion
20 base plate 21 protrusion, base plate protrusion
22 metal conductive leads
23 contact bridge
24 base plate
25 contact pads
26 RFID tag
27 RFID antenna
28 side parts
29 central part
30 holding portions
31 hook portion
32 shelve portion
33 base shelve portion

The invention claimed is:

1. A connector arrangement having a connector and a corresponding mating connector, the connector comprising a housing and a first locking feature for latching with a corresponding second locking feature of the mating connector, the connector further comprising a mating detection device for detecting a locked state of the first locking feature with the second locking feature, wherein the first locking feature comprises a resilient member, which is deflected by the second locking feature during a mating process, and which is released when the mating process is complete, establishing the locked state, wherein the mating detection device comprises an electric circuit with a spring contact for opening and closing the electric circuit, the spring contact comprising two resilient contact arms, wherein the resilient contact arms are both transferred from an initial position to a translocated position by the resilient member when the resilient member is deflected during the mating process, and wherein in the locked state the second locking feature obstructs only one of the resilient contact arms from returning into the initial position when the resilient member is released, wherein the two resilient contact arms have respective contact portions overlapping in a direction from the initial position to the translocated position, wherein the contact portions remain in a switching state of being mutually separated or of being mutually in contact when the resilient member is deflected during the mating process, and wherein the contact portions change their switching state between being mutually separated and being mutually in contact when the unobstructed one of the resilient contact arms springs back towards the initial position.

2. The connector arrangement according to claim 1, wherein at least the unobstructed one of the resilient contact arms is preloaded towards the initial position by being transferred into the translocated position, resulting in a biasing force that urges the resilient contact arm towards the initial position by elastic deformation of the resilient contact arm.

3. The connector arrangement according to claim 1, wherein a protrusion is arranged on the obstructed one of the resilient contact arms, the protrusion extending in the initial position into a space occupied by the second locking feature in the locked state.

4. The connector arrangement according to claim 1, wherein at least one of the two resilient contact arms are made of metal.

5. The connector arrangement according to claim 1, wherein at least one of the two resilient contact arms has a leg portion attached to the resilient member.

6. The connector arrangement according to claim 1, wherein the obstructed one of the resilient contact arms extends in the initial position into a space occupied by the second locking feature in the locked state.

7. The connector arrangement according to claim 1, wherein the electric circuit is disposed on a circuit board, the two resilient contact arms having respective base portions connected to the circuit board.

8. The connector arrangement according to claim 7, wherein the circuit board is arranged on the housing.

9. The connector arrangement according to claim 7, wherein the circuit board is arranged on the base plate.

10. The connector arrangement according to claim 1, wherein the two resilient contact arms are arranged on a base plate, the base plate being attached to the resilient member.

11. The connector arrangement according to claim 10, wherein a protrusion is arranged on the base plate extending in the initial position into a space occupied by the second locking feature in the locked state.

12. The connector arrangement according to claim 1, wherein at least one of the two resilient contact arms is made of plastic with metal conductive leads disposed on it.

13. The connector arrangement according to claim 12, wherein the two resilient contact arms are formed in one piece, wherein the obstructed one of the resilient contact arms has a contact bridge formed thereon and the unobstructed one of the resilient contact arms has two separated conductive leads connected to the electric circuit.

14. The connector arrangement according to claim 12, wherein the two resilient contact arms and a base plate are formed in one piece.

15. A connector arrangement having a connector and a corresponding mating connector, the connector comprising a housing and a first locking feature for latching with a corresponding second locking feature of the mating connector, the connector further comprising a mating detection device for detecting a locked state of the first locking feature with the second locking feature, wherein the first locking feature comprises a resilient member, which is deflected by the second locking feature during a mating process, and which is released when the mating process is complete, establishing the locked state, wherein the mating detection device comprises an electric circuit with a spring contact for opening and closing the electric circuit, the spring contact comprising two resilient contact arms, wherein the resilient contact arms are both transferred from an initial position to a translocated position by the resilient member when the resilient member is deflected during the mating process, and wherein in the locked state the second locking feature obstructs only one of the resilient contact arms from returning into the initial position when the resilient member is released, wherein the two resilient contact arms have respective contact portions overlapping in a direction from the initial position to the translocated position, wherein the contact portions remain in a switching state of being mutually separated or of being mutually in contact when the resilient member is deflected during the mating process, and wherein the contact portions change their switching state between being mutually separated and being mutually in contact when the unobstructed one of the resilient contact arms springs back towards the initial position, wherein the electric circuit is disposed on a circuit board, the two resilient contact arms having respective base portions connected to the circuit board.

16. The connector arrangement according to claim 15, wherein the circuit board is arranged on the housing.

17. The connector arrangement according to claim 15, wherein at least one of the two resilient contact arms is made of plastic with metal conductive leads disposed on it.

18. A connector arrangement having a connector and a corresponding mating connector, the connector comprising a housing and a first locking feature for latching with a corresponding second locking feature of the mating connector, the connector further comprising a mating detection device for detecting a locked state of the first locking feature with the second locking feature, wherein the first locking feature comprises a resilient member, which is deflected by the second locking feature during a mating process, and which is released when the mating process is complete, establishing the locked state, wherein the mating detection device comprises an electric circuit with a spring contact for opening and closing the electric circuit, the spring contact comprising two resilient contact arms, wherein the resilient contact arms are both transferred from an initial position to a translocated position by the resilient member when the resilient member is deflected during the mating process, and wherein in the locked state the second locking feature obstructs only one of the resilient contact arms from returning into the initial position when the resilient member is released, wherein the two resilient contact arms have respective contact portions overlapping in a direction from the initial position to the translocated position, wherein the contact portions remain in a switching state of being mutually separated or of being mutually in contact when the resilient member is deflected during the mating process, and wherein the contact portions change their switching state between being mutually separated and being mutually in contact when the unobstructed one of the resilient contact arms springs back towards the initial position, wherein the two resilient contact arms are arranged on a base plate, the base plate being attached to the resilient member.

19. The connector arrangement according to claim 18, wherein a protrusion is arranged on the base plate extending in the initial position into a space occupied by the second locking feature in the locked state.

20. The connector arrangement according to claim 19, wherein the electric circuit is disposed on a circuit board, the two resilient contact arms having respective base portions connected to the circuit board, wherein the circuit board is arranged on the base plate.

* * * * *